Sept. 29, 1925.
G. M. STEVENS
1,555,389
ROLL FOR PRINTING PRESSES AND METHOD OF MAKING SAME
Filed Oct. 24, 1923
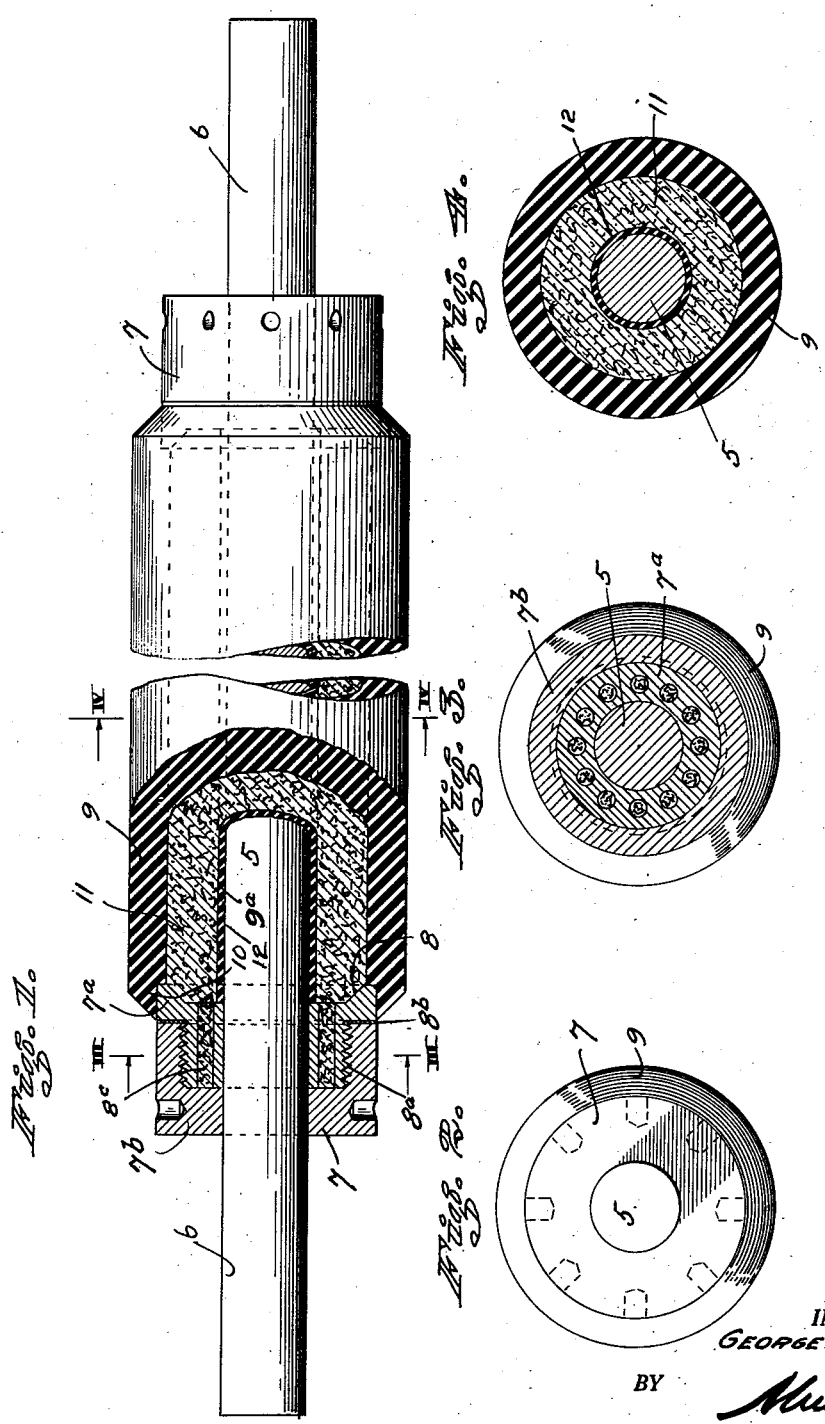
INVENTOR.
GEORGE M. STEVENS
BY
ATTORNEYS.

Patented Sept. 29, 1925.

1,555,389

UNITED STATES PATENT OFFICE.

GEORGE M. STEVENS, OF SAN FRANCISCO, CALIFORNIA.

ROLL FOR PRINTING PRESSES AND METHOD OF MAKING SAME.

Application filed October 24, 1923. Serial No. 670,588.

*To all whom it may concern:*

Be it known that I, GEORGE M. STEVENS, a citizen of the United States, and a resident of San Francisco, county of San Francisco, State of California, have invented a new and useful Roll for Printing Presses and Method of Making Same, of which the following is a specification.

This invention relates to rolls for printing presses and has for its primary object the provision of a novel device of this character which shall be simple of construction, strong and durable and particularly characterized by an elastic facing which inherently yields and adapts itself to the type during the inking process and which freely assumes a normal smooth state as the roll is moved out of contact with the type, and which said surface is so formed whereby it is not liable to deteriorate prematurely.

A further object of the invention resides in the provision of means which will give maximum life to the roll and wherein the elastic imprinting surface thereof will be capable of withstanding considerable rough usage without impairing said surface, and, wherein, from the nature of the materials employed, said surface will not disintegrate while in use.

A further object of the invention is to provide an inking roll having a novel imprinting surface of an elastic nature wherein said surface will constantly maintain a position in parallelism with the axis of the roll.

My invention, therefore, comprises certain new features of construction and arrangement and combination of elements hereinafter set forth and pointed out in the claims annexed hereto.

Figure 1 is a view in side elevation of the roll, Figure 2 is an end view of the roll; Figure 3 is a section on line 3—3 of Figure 1; and Figure 4 is a section on line 4—4 of Figure 1.

In carrying the invention into practice I employ a spindle (5) having end trunnions 6—6 of usual construction. The spindle is provided with sectional spaced caps 7—7 whose sections (7ª) are provided with frustoconical cavities (8) surrounding the spindle in spaced relation thereto. Said sections (7ª) are threaded to the sections (7ᵇ) shown at (8ª) and where the sections meet, I employ sealing gaskets (8ᵇ).

The roll body consists of an outer facing (9) of hollow cylindrical construction. This facing is preferably formed of soft rubber having a close texture. The ends of this cylindrical facing are flared at (10) so as to fit over the ends of the cap sections (7ª). The purpose of this construction will be described in detail as the description progresses.

In order that the soft elastic facing may be maintained in true parallel relation with the spindle (5), and whereby said facing will be uniformly held against bulging in an outward direction toward serious distortion that would interrupt or destroy this intended condition of the parts, I provide a cellular core (11) which is preferably in the nature of sponge rubber vulcanized to the inner walls of the outer elastic surface (9) and at (9ª) to a hard rubber sleeve 12, the latter being vulcanized to the spindle (5) between the aforesaid caps 7—7. By providing the sponge rubber core with conical ends as shown which fit the corresponding cavities (8) in said caps (7) it is manifest that there is an induced tendency created by frictional engagement of the walls of said cavities (8) against said conical ends to maintain close confinement of the sponge rubber core to limit its longitudinal elongation on the application of stress thereto. The spindle (5) now acts as a rigid or inflexible support or backing for the sponge rubber core and when pressure is brought upon the surface (9) on contact with the type, said surface is freely responsive to the action of pressure thus created and same properly adapts itself to surface inequalities of the type. By interposing the sponge rubber core (11) between the spindle (5) and the inner walls of the surface (9) such cushioning action is set up so as to insure maximum delicate resiliency necessary to a uniform application of ink to the type when the surface (9) is brought into engagement therewith.

I find in practice that a roll constructed in this manner is exceedingly pliable and elastic and that the imprinting surface of the roll always maintains a position in parallelism with the axis of the roll and that by providing a soft rubber surface (9) of suitable texture and a coacting backing (11) of cellular elastic material the roll is exceedingly strong and durable and is capable of withstanding considerable rough usage without prematurely disintegrating the effective imprinting surface of the roll.

While I have described a core (11) of cellular material it shall be understood that this is for illustration primarily and although I find it most desirable for the purpose intended I do not wish to be limited to the use of this specific material. I am particularly interested in the two inherent qualities of the coacting materials of which the surface (9) and core (11) are constructed and in this respect the core is exceedingly more pliable than the outer imprinting surface, one being of close texture of soft rubber and the other of open texture or cellular arrangement.

In the process of manufacturing the roll, I first vulcanize the sponge rubber (11) to the facing (9) and to the hard rubber sleeve 12 and the latter to said spindle (5). At this time, I remove the cap sections (7b), whereby, in the vulcanizing process, all induced gas is free to escape through the vent holes (8c) in the cap sections (7a). In this manner, I am able to safeguard against injuring the facing (9) in the vulcanizing process. After the parts are firmly vulcanized as aforesaid, the cap sections (7b) are then connected with said sections (7a) and brought to bear against said gaskets (8b). While the holes (8c) are provided for the purpose of allowing the gas to escape from the structure during the vulcanizing process, it will be observed that when the rubber is in a hot state, it freely flows into said holes (8c) and when the rubber dries and sets, the parts which fill said holes serve to securely fix the rubber to the cap sections (7a). The arrangement as shown and described herein is such that a roll is produced which is reliable of action; strong and durable, and one where the rubber parts (9), (9a) and (11) are joined together almost as a homogeneous mass and incident thereto, supported by the fact that these parts are firmly vulcanized to the cap sections (7a) and the part (11) vulcanized to the hard rubber sleeve (12), it follows that said parts are positively held against casual relative rotation.

As previously stated, the ends of the cylindrical facing (9) are made to overlap the caps (7). I prefer an arrangement of this character so that the caps are disposed inwardly of the effective inking surface of the facing where said cap will not directly engage with the surface to be inked as the roll functions.

I claim:

1. The method of making rubber printing rolls which comprises vulcanizing a soft rubber shell, spongy filler and rubber sleeve to a spindle and permitting any expansion and gas caused through vulcanizing to find relief at the ends of the roll.

2. A printing roll comprising a spindle, caps secured to said spindle, a foundation sleeve of hard rubber embracing the spindle and vulcanized thereto, a body of sponge rubber embracing the foundation sleeve and vulcanized thereto and to said caps, and a facing of soft rubber embracing said body of sponge rubber and vulcanized thereto.

3. A printing roll comprising a spindle, caps secured to said spindle, a foundation sleeve of hard rubber embracing the spindle and vulcanized thereto, a body of sponge rubber embracing the foundation sleeve and vulcanized thereto and to said caps, and a facing of soft rubber embracing said body of sponge rubber and vulcanized thereto, said facing having its ends overlapping portions of said caps, and said sponge rubber being confined between said caps.

4. A printing roll comprising a spindle, caps secured to said spindle, a foundation sleeve embracing the spindle and vulcanized thereto, a body of sponge rubber embracing the foundation sleeve and vulcanized thereto and to said caps, and a facing of soft rubber embracing said body of sponge rubber and vulcanized thereto, the caps having holes therein into which the rubber of the said body is adapted to flow during the vulcanizing process.

5. A printing roll comprising a spindle, sectional caps secured to said spindle, a foundation sleeve embracing the spindle and vulcanized thereto, a body of sponge rubber embracing the foundation sleeve and vulcanized thereto and to said caps, and a facing of soft rubber embracing said body of sponge rubber and vulcanized thereto, one of said sections having holes therein into which the rubber of the body is adapted to flow during the vulcanizing process and from which gas is permitted to escape as and for the purpose set forth.

6. A printing roll comprising a spindle having spaced caps, a rubber sleeve vulcanized to the spindle between the caps, a cylindrical body of sponge rubber vulcanized to said sleeve, and a facing of soft rubber vulcanized to said cylindrical body, one of said caps being perforated to permit escape of pressure generated in the vulcanizing process.

GEORGE M. STEVENS.